United States Patent Office 3,652,565
Patented Mar. 28, 1972

3,652,565
NOVEL DIBASIC ACID COMPOUNDS AND MEANS FOR THE PRODUCTION THEREOF
John Davoll, Shepperton, Middlesex, and Anthony Michael Johnson, Twickenham, Middlesex, England, assignors to Parke, Davis & Company, Detroit, Mich.
No Drawing. Filed July 29, 1969, Ser. No. 845,886
Claims priority, application Great Britain, Nov. 1, 1968, 51,867/68
Int. Cl. C07d 51/42
U.S. Cl. 260—256.4 N      8 Claims

ABSTRACT OF THE DISCLOSURE

Novel pyrimidinylbenzylaminobenzoyl aspartic acid compounds (I), di-salts, and acid addition salts are provided by hydrolysis of corresponding compounds having groups hydrolyzable to aspartic acid carboxyl groups

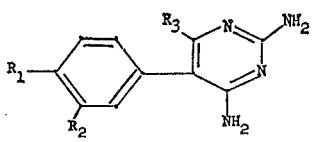

(I)

where one of $R_1$ and $R_2$ is the group

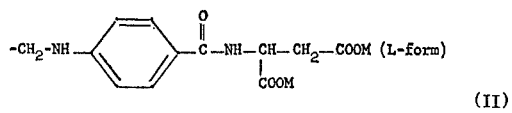

(II)

and the other of $R_1$ and $R_2$ is H or $C_{1-4}$ alkyl or alkoxy, $R_3$ is H or $C_{1-4}$ alkyl, and M is H or a cation. The compounds have antimetabolic and bacteriostatic properties and are useful antimetabolic and bacteriostatic agents.

SUMMARY AND DETAILED DESCRIPTION

This invention relates to novel chemical compounds and means for producing the same. More particularly, this invention relates to novel dibasic acid compounds and corresponding di-salts having the formula

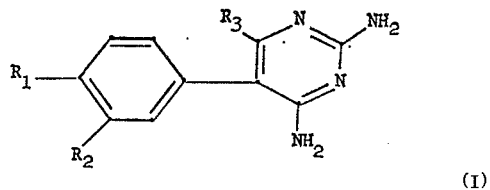

(I)

and acid addition salts of the dibasic acid compounds; where one of $R_1$ and $R_2$ represents the group

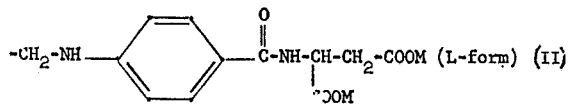

(II)

and the other of $R_1$ and $R_2$ is a hydrogen atom or an alkyl or alkoxy group of 1 to 4 carbon atoms, preferably methyl or methoxy; $R_3$ is a hydrogen atom or an alkyl group of 1 to 4 carbon atoms, preferably methyl or ethyl; and M is a hydrogen atom or a salt-forming cation.

In accordance with the invention the compounds of Formula I are produced by the hydrolysis of a compound having the formula

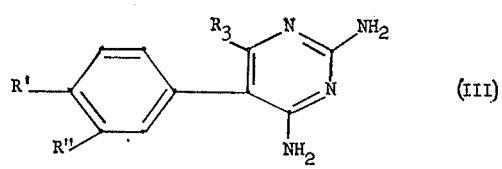

(III)

where one of R' and R" represents the group

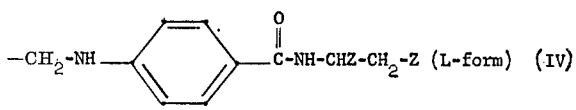

(IV)

and the other of R' and R" is a hydrogen atom or an alkyl or alkoxy group of 1 to 4 carbon atoms, preferably methyl or methoxy, $R_3$ has the above-specified significance and Z is a group hydrolyzable to a carboxyl group. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

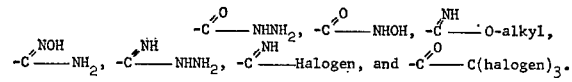

The precise nature of the group Z which is hydrolyzable to a carboxyl group is not critical because in carrying out the process it is converted to a carboxyl group. Therefore, if desired, the group Z can in appropriate cases contain one or more substituents such as lower alkyl, lower alkoxy, halogen, nitro, carboxy, or alkoxycarbonyl, and in those cases where the group Z is basic, it can also be employed in the form of an acid addition salt. As used herein the term "group hydrolyzable to a carboxyl group" designates substituted as well as unsubstituted radicals. Compounds in which the group Z is the alkoxycarbonyl group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Z groups, for example with the

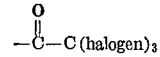$_3$ group. The hydrolysis can be carried out in water or in an aqueous solution of an unreactive, water miscible, organic solvent such as an aliphatic alcohol, dioxane, tetrahydrofuran, ethylene glycol, propylene glycol or a lower alkyl ether of ethylene glycol or of diethylene gycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolysis is carried out by treating a solution or suspension of the starting material with a solvent medium containing an acid or a base until hydrolysis of the group Z is substantially complete. The required time and temperature naturally vary with the specific group Z and the basic or acidic agent used. However, in general, the reaction is carried out at room temperature or below; higher temperatures may be used but are less satisfactory. Reaction is essentially complete in one to two hours although longer reaction periods may be required to insure completeness of reaction. As will be understood, the product obtained by acid hydrolysis is the free di-acid or acid addition salt thereof whereas the product of basic hydrolysis is the di-salt. The latter product can be isolated as the di-acid or acid addition salt, respectively, by neutralization with acid or treatment with acid in amount for neutralization and acid salt formation. Conversely, the acid product can be isolated as the di-salt after basification with the appropriate base. A variety of organic and inorganic bases can be used such as sodium hydroxide, potassium hydroxide, calcium hydroxide, sodium carbonate, ammonia, 2-hydroxyethylamine and choline. In obtaining the di-salt, it is preferred for optimum yields to use only the amount (or a slight excess) of base required for formation of the di-salt. Larger amounts may cause decreased yields of the desired di-salt. The invention contemplates the mentioned salt products formed with any of a variety of inorganic and organic acids among which may be mentioned hydrochloric, sulfuric, nitric, phosphoric, acetic, citric, benzoic and pamoic acids.

The products of the invention possess pharmacological properties. In particular, the compounds possess antifolic acid activity and are useful as antimetabolic agents. The activity is demonstrable by standard tests. In one such test (cf. D. W. Woolley, A Study of Antimetabolites, John Wiley and Sons, New York, 1952, pp. 66–68) the activity is of the same order generally as that of the known antifolic substance amethopterin. To cite a case, the L-aspartic acid compound having Formula I, where $R_1$ is the group having Formula II, M and $R_2$ are hydrogen, and $R_3$ is methyl, has an antifolic inhibition index of about 0.015 versus *S. faecalis* R. The compounds are useful as antimetabolites for those applications in which it is desired to antagonize folic acid activity and thereby inhibit metabolic growth. The compounds also have bacteriostatic activity. In standard tests the compounds typically inhibit such organisms as *S. faecalis* R, *L. arabinosus, L. casei* and *S. faecalis* A. Specifically, half-inhibition is provided at concentrations of about 200 nanograms per milliliter or lower concentration. The compounds are useful as bacteriostatic agents for topical application or in aqueous suspension for the inhibition of undesirable effects produced by bacteria. For example, the compounds can be used in dilute solution for the prevention of milk spoilage. They can also be used in solution to minimize decomposition and gas formation in self-contained sanitary disposal or sewage units. The compounds can also be used as intermediates for production of other compounds having similar or related structure.

The starting materials for the process of the invention are novel but can be prepared from known materials by general procedures illustrated specifically in the following description. The invention is illustrated by the following examples.

EXAMPLE 1

(a) A solution of 2.8 g. of N-[p-[[p-(2,4-diamino-5-pyrimidinyl)benzyl]amino]benzoyl] - L - aspartic acid diethyl ester, 40 ml. of ethanol, and 9 ml. of 2 N sodium hydroxide is stirred eighteen hours. The product which separates, N-[p-[[p-(2,4 - diamino - 5 - pyrimidinyl)benzyl] amino]benzoyl]-L-aspartic acid, disodium salt, tetrahydrate, is filtered, washed with ethanol and dried.

To provide the corresponding free acid product, an aqueous solution of the salt is neutralized using 2 N hydrochloric acid. Clusters of small white needles, which decompose between 240–300° C., are collected as free acid product.

An ethanolic solution of 0.5 g. of the free acid is treated with 10 ml. of 0.2 N potassium hydroxide solution. Evaporation to dryness yields the corresponding dipotassium salt.

(b) Using an ethanol solution of the free acid product obtained as in paragraph (a), the corresponding ammonium and ethanolamine di-salts are prepared by treating the solution with two molar equivalents of the respective base (ammonia or 2-hydroxyethylamine) in an aqueous solution, and recovering the solid product which separates on standing.

(c) The diethyl ester starting material for the procedure of paragraph (a) can be prepared as follows:

Diazotization of a solution of 6.0 g. of 2,4-diamino-5-(p-aminophenyl)pyrimidine [P. B. Russell and G. H. Hitchings, J. Am. Chem. Soc., 73: 3763 (1951)] and 63 ml. of 2 N hydrochloric acid is carried out at temperatures below 10° using a solution of 2.2 g. of sodium nitrite and 15 ml. of water. After filtration, this solution is added, with stirring, to a warm solution prepared by addition of 7.1 g. of cupric sulfate pentahydrate in 23 ml. of water to 8.4 g. of potassium cyanide in 15 ml. of water. The resulting mixture is stirred one-half hour at 50–55° and then cooled to 40° for treatment by 30 ml. of aqueous ammonium hydroxide. After stirring for one hour, a crude product is collected by filtration, washed with dilute ammonium hydroxide, and then dried. This product is dissolved in hot 10% acetic acid for treatment with activated charcoal and the treated solution neutralized by aqueous ammonium hydroxide. Recrystallization of the separated solid from 50% aqueous ethanol, using activated charcoal as required, yields p-(2,4-diamino-5-pyrimidinyl)benzonitrile, decomposition point (D.P.) 296–300°.

(d) A solution of 1.1 g. of p-(2,4-diamino-5-pyrimidinyl)benzonitrile and 23 ml. of 66% acetic acid is treated with 1.9 g. of p-aminobenzoyl-L-aspartic acid, diethyl ester, and the resulting solution is hydrogenated in the presence of Rainey nickel catalyst at room temperature and pressure until hydrogen uptake ceases (about 2½ hours). After removal of catalyst, the reaction mixture is concentrated and its residue triturated with 2 N sodium carbonate overnight. Decantation, followed by drying, yields the product, N-[p-[[p-(2,4-diamino-5-pyrimidinyl) benzyl]amino]benzoyl]-L-aspartic acid, diethyl ester. The product is dissolved in hot ethanol for treatment by activated charcoal. The treated solution is then used for the hydrolysis procedure described above.

(e) In the same manner corresponding ester starting materials can be produced from the appropriate nitrile as follows:

| 2,4-diamino-5-pyrimidinyl nitrile, starting material | N-[p-aminobenzoyl]-L-aspartic acid, diethyl ester, starting material. |
|---|---|
| 4-pyrimidinyl o-tolunitrile, M.P. 256–263° C. | N-[4-(2,4-diamino-5-pyrimidinyl)-2-methylbenzyl]. |
| m-Pyrimidinyl benzonitrile, M.P. 226–227° C. (ethanol). | N-[m-2,4-diamino-5-pyrimidinyl)-benzyl]. |
| 5-pyrimidinyl-2-methoxybenzonitrile, D.P. 278–280° C. | N-[5-(2,4-diamino-5-pyrimidinyl)-2-methoxybenzyl]. |
| p-(6-methyl-pyrimidinyl) benzonitrile. | N-[p-(2,4-diamino-6-methyl-5-pyrimidinyl)benzyl]. |
| p-(6-ethyl-pyrimidinyl) benzonitrile. | N-[p-(2,4-diamino-6-ethyl-5-pyrimidinyl)benzyl]. |

EXAMPLE 2

A solution of 2.86 g. of N-[p-[[4-(2,4-diamino-5-pyrimidinyl) - 2 - methylbenzyl]amino]benzoyl] - L- aspartic acid, diethyl ester, 40 ml. of ethanol and 9 ml. of 2 N sodium hydroxide is stirred eighteen hours. The reaction solution is neutralized with 2 N hydrochloric acid and the resulting precipitate collected by filtration and dissolved in cold 50% ethanol containing excess sodium hydroxide for treatment with activated charcoal. Neutralization, using 2 N hydrochloric acid, yields the product, N-[p-[[4 - (2,4 - diamino - 5 - pyrimidinyl) - 2 - methylbenzyl] amino]benzoyl] - L - aspartic acid, trihydrate, which separates in crystalline form and is collected; D.P. 260–300° C.

To obtain the corresponding acid addition salt, an ethanolic solution of 0.5 g. of the free acid is treated with 1 ml. of 1 N hydrochloric acid. The resulting monohydrochloride salt is removed by filtration. The corresponding salt with one-half formula weight of pamoic acid is obtained by stirring together an ethanolic solution of the salt product with an aqueous solution of one-half equivalent of disodium pamoate monohydrate, cooling the resulting mixture and collecting the product which separates.

The nitrile starting material [Example 1e] for the production of the ester starting material of the above procedure can be obtained as follows:

(a) A mixture of 16.5 g. of 4-amino-m-toluic acid, methyl ester, 150 g. of ice, and 17 ml. of concentrated hydrochloric acid is diazotized at 0° using a solution of 7 g. of sodium nitrite and 30 ml. of water. After filtration, the resulting mixture is quickly added to a solution prepared by successive treatment of 12.5 g. of cupric sulfate pentahydrate in 25 ml. of water with 18 ml. of 6 N ammonium hydroxide, 13 g. of potassium cyanide in 20 ml. of water, and 40 ml. of benzene. This mixture is stirred at 60° one-half hour, and then cooled for filtration. Benzene washes of the filtered solid are combined with the filtrate for washing by dilute ammonium hydroxide and water. After drying, the organic portion is concentrated and its residue recrystallized from methanol to yield 4-cyano-m-toluic acid, methyl ester; M.P. 78–80°, as product.

(b) A suspension of 0.34 g. of finely powdered potassium borohydride and 4.2 ml. of dried tetrahydrofuran at 0° is treated with 0.27 g. of anhydrous lithium chloride. After stirring ten minutes at 0° and eighteen hours at 20°, this mixture is treated with a solution of 1.8 g. of 4-cyano-m-toluic acid, methyl ester and 2.5 ml. of anhydrous tetrahydrofuran. The resulting mixture is refluxed six hours, cooled, and then treated dropwise with 2.4 ml. of 2 N sulfuric acid. Dilution with water precipitates the product, 4-(hydroxymethyl)-o-tolunitrile.

(c) A mixture of 1.5 g. of 4-(hydroxymethyl)-o-tolunitrile, 14 ml. of dry ether, and 1.4 ml. of triethylamine is treated with 0.78 ml. of methanesulfonyl chloride at a rate such that a temperature less than 20° is maintained. After twenty minutes, the resulting mixture is diluted with water and ethyl acetate. The organic layer is separated, washed with wtaer, dried, and then concentrated in vacuo. Crystallization of the residue, using carbon tetrachloride, yields 4-(hydroxymethyl)-o-tolunitrile, methanesulfonate ester; M.P. 68–70°, as product.

(d) To a stirring solution of 4.5 g. of 4-(hydroxymethyl)-o-tolunitrile, methanesulfonate ester, in 4 ml. of dimethylformamide, is added a solution of 2.9 g. of sodium cyanide in 30 ml. of dimethylformamide. The resulting mixture is stirred three hours at 50° and then diluted by the addition of 400 ml. each of water and ethyl acetate. The organic layer is separated, washed with water, dried, and then concentrated to provide the product, 4-cyano-3-methylphenylacetonitrile.

(e) A stirring suspension of 0.43 g. of sodium methoxide in 50 ml. of dry benzene is treated successively with 0.68 ml. of ethyl formate and 1.2 g. of 4-cyano-3-methylphenylacetonitrile. After ninety minutes, the resulting mixture is stirred with 40 ml. of water and filtered. The aqueous layer is washed with ethyl acetate, acidified with 2 N hydrochloric acid, and then extracted with ether. The product, α-cyano-α-(4-cyano-m-tolyl)acetaldehyde, M.P. 178–181°, is obtained upon concentration of the extracts. By this procedure, substituting 3-cyano-4-methoxyphenylacetonitrile for the nitrile reactant, the product obtained is α - cyano - α-(3-cyano-4-methoxyphenyl)acetaldehyde; D.P. 184–187° C.

(f) A mixture of 3.8 g. of α-cyano-α-(4-cyano-m-tolyl) acetaldehyde and 12 ml. of ethyl orthoformate is heated at 150–160° for one and one-half hours and at 180–190° for one-half hour. Ethyl formate and ethanol formed during enolization are removed through a short fractionating column. Concentration at 100° (5 mm.) yields the product, α - (4-cyano-m-tolyl)-β-ethoxyacrylonitrile. By this procedure, substituting α - cyano-α-(3-cyano-4-methoxyphenyl)acetaldehyde for the aldehyde reactant, the product obtained is α - (3-cyano-4-methoxyphenyl)-β-ethoxyacrylonitrile.

(g) A mixture of α-(4-cyano-m-tolyl)-β-ethoxyacrylonitrile, and 1.2 g. of guanidine in 25 ml. of ethanol is refluxed two hours and then cooled. The product, 4-(2,4-diamino-5-pyrimidinyl)-o-tolunitrile, which after recrystallization from ethanol melts at 256–263°, is separated by filtration. By this procedure substituting α - (3-cyano-4-methoxyphenyl)-β-ethoxyacrylonitrile for the nitrile reactant, the product obtained is 5 - (2,4-diamino-5-pyrimidinyl)-2-methoxybenzonitrile; D.P. 278–280° C.

EXAMPLE 3

A solution of 2.80 g. of N-[p-[[m-(2,4-diamino-5-pyrimidinyl)benzyl]amino]benzoyl] - L-aspartic acid, diethyl ester, 40 ml. of ethanol and 9 ml. of 2 N sodium hydroxide (or equivalent amount of potassium hydroxide) is stirred eighteen hours. The reaction mixture is neutralized with 2 N hydrochloric acid to yield N-[p-[[m-(2,4-diamino-5-pyrimidinyl)benzyl]amino]benzoyl]-L-aspartic acid, monohydrate, M.P. 202–208°, as product.

By a similar hydrolysis procedure starting with corresponding ester starting materials [Example 1e)] the products obtained are N-[p-[[p-(2,4-diamino-6-methyl-5-pyrimidinyl)benzyl]amino]benzoyl]-L-aspartic acid, monohydrate (D.P. above 260°) and N-[p-[[p-(2,4-diamino-6-ethyl - 5 - pyrimidinyl)benzyl]amino]benzoyl]-L-aspartic acid, monohydrate (D.P. 155–180°).

The nitrile starting material [Example 1e)] for the production of the ester starting material of the above procedure can be prepared as follows:

(a) A solution of 0.6 g. of sodium and 15 ml. of ethanol at 0° is treated successively with 3.7 g. of α-cyano-m-tolunitrile in 5 ml. of warm ethanol and 2.1 g. of ethyl formate. After stirring at 0° for one-half hour, the reaction mixture is heated two hours on a steam bath, cooled, and then dissolved in 120 ml. of cold water. Filtration, followed by acidification with 15 ml. of 2 N sulfuric acid, yields α - cyano-α-formyl-m-tolunitrile, M.P. 199–200° after recrystallization from aqueous ethanol.

(b) A suspension of 2.8 g. of α-cyano-α-formyl-m-tolunitrile and 50 ml. of dry ether is treated with ethereal diazomethane. After standing three hours at room temperature, this mixture is concentrated to provide the crystalline product, α-(3 - cyanophenyl)-β-methoxyacrylonitrile.

(c) A solution of 3.0 g. of α-(3-cyanophenyl)-β-methoxyacrylonitrile and 20 ml. of ethanol at 75° is treated with a solution of 1.2 g. of guanidine in 40 ml. of ethanol. After refluxing three hours, the reaction mixture is cooled. The product, m-(2,4-diamino-5-pyrimidinyl)benzonitrile, is collected by filtration; M.P. 226–227° after recrystallization from ethanol.

EXAMPLE 4

A soltuion of 2.90 g. of N-[p-[[5-(2,4-diamino-5-pyrimidinyl) - 2 - methoxybenzyl]amino]benzoyl]-L-aspartic acid, diethyl ester, 40 ml. of ethanol and 9 ml. of 2 N sodium hydroxide is stirred 18–20 hours. The reaction mixture is neutralized with hydrochloric acid and the product, N-[p-[[5 - (2,4-diamino-5-pyrimidinyl)-2-methoxybenzyl]amino]benzoyl]-L-aspartic acid, 2½ hydrate, is collected; D.P. 278°.

The nitrile starting material [Example 1e) and 2g)] for the production of the ester starting material of the above procedure can be obtained from α-(3-cyano-4-methoxyphenyl)-β-ethoxyacrylonitrile [Example 2f)] and α-cyano-α - (3-cyano-4-methoxyphenyl)acetaldehyde [Example 2e)] starting with 3 - cyano-4-methoxyphenylacetonitrile prepared as follows:

(a) After refluxing at 180° for four hours, a mixture of 19 g. of 3-bromo-p-anisic acid, methyl ester (K. G. Rao and L. R. Row, J. Org. Chem., 1960, 25, 981), 8.0 g. of cuprous cyanide, and 12 ml. of dimethylformamide is cooled to around 100° for addition to a solution of 15.5 g. of sodium cyanide and 50 ml. of water. The separating crystals are filtered, washed with water, and dried in vacuo. The resulting solid is dissolved in 300 ml. of benzene for treatment with anhydrous magnesium sulfate and activated charcoal. Concentration yields 3-cyano-p-anisic acid, methyl ester; M.P. 123–125.5° after recrystallization from carbon tetrachloride.

(b) A solution of 0.31 g. of powdered sodium borohydride and 8 ml. of diglyme, is treated with 0.72 g. of lithium bromide. After stirring thirty minutes, the resulting mixture is treated portionwise with 1.4 g. of 3-cyano-panisic acid, methyl ester. This mixture is cooled, following six and one-half hours stirring at 95–100°, for addition to a mixture of 75 g. of ice and 1.6 ml. of concentrated hydrochloric acid. The product which separates, α-hydroxy-4-methoxy-m-tolunitrile, is collected by filtration. The filtrate is extracted with ether and the extracts concentrated to provide additional product which combined with the first yield separating is recrystallized from carbon tetrachloride; M.P. 84–88°.

(c) A mixture formed by the addition of 0.96 ml. of thionyl chloride to 1.6 g. of α-hydroxy-4-methoxy-m-tolunitrile in 25 ml. of benzene is refluxed ninety minutes and concentrated to provide the product α-chloro-4-methoxy-m-tolunitrile.

(d) A mixture formed by treating a solution of the above product in 15 ml. of ethanol with a solution of 0.58 g. of sodium cyanide and 3.3 ml. of water is refluxed three hours at 95–100° and then concentrated. The residue is treated with water and ethyl acetate and the organic phase is separated and concentrated to provide 3-cyano-4-methoxyphenylacetonitrile.

We claim:
1. Dibasic acid compounds and corresponding di-salts having the formula

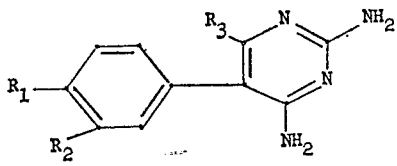

and pharmaceutically acceptable acid addition salts of the dibasic acid compounds; where one of $R_1$ and $R_2$ represents the group

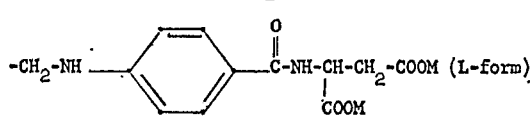

and the other of $R_1$ and $R_2$ is a hydrogen atom or an alkyl or alkoxy group of 1 to 4 carbon atoms, $R_3$ is a hydrogen atom or an alkyl group of 1 to 4 carbon atoms, and M is a hydrogen atom or a salt-forming cation selected from the group consisting of sodium, potassium, calcium, ammonium, 2-hydroxyethylamine, and choline cations.

2. A compound according to claim 1 which compound is N-[p-[[p-(2,4-diamino - 5 - pyrimidinyl)benzyl]amino] benzoyl]-L-aspartic acid in free acid form or di-salt or acid addition salt form.

3. A compound according to claim 1 which compound is N-[p-[[4-(2,4 - diamino - 5 - pyrimidinyl)-2-methylbenzyl]amino]benzoyl]-L-aspartic acid.

4. A compound according to claim 1 which compound is N - [p - [[m - (2,4 - diamino - 5 - pyrimidinyl)benzyl] amino]benzoyl]-L-aspartic acid.

5. A compound according to claim 1 which compound is N-[p-[[p-(2,4-diamino - 6 - methyl - 5 - pyrimidinyl) benzyl]amino]benzoyl]-L-aspartic acid in free acid form or di-salt or acid addition salt form.

6. A compound according to claim 1 which compound is N-[p-[[p-(2,4-diamino - 6 - methyl - 5 - pyrimidinyl) benzyl]amino]benzoyl]-L-aspartic acid.

7. A compound according to claim 1 which compound is N-[p-[[p-(2,4 - diamino - 6 - ethyl-5-pyrimidinyl)benzyl]amino]benzoyl]-L-aspartic acid.

8. A compound according to claim 1 which compound is N-[p-[[5-(2,4 - diamino - 5 - pyrimidinyl)-2-methoxybenzyl]amino]benzoyl]-L-aspartic acid.

No references cited.

ALEX MAZEL, Primary Examiner

R. J. GALLAGHER, Assistant Examiner

U.S. Cl. X.R.
424—200, 251